April 26, 1955     W. A. SHURCLIFF     2,707,237
RADIATION DETECTION DEVICES
Filed June 2, 1951     2 Sheets-Sheet 1

INVENTOR
William A. Shurcliff
BY
Brown and Mikulka
ATTORNEYS

April 26, 1955   W. A. SHURCLIFF   2,707,237
RADIATION DETECTION DEVICES

Filed June 2, 1951   2 Sheets-Sheet 2

INVENTOR
William A. Shurcliff
BY
Brown and Mikulka
ATTORNEYS

United States Patent Office 2,707,237
Patented Apr. 26, 1955

2,707,237

RADIATION DETECTION DEVICES

William A. Shurcliff, Cambridge, Mass., assignor to Polaroid Corporation, Cambridge, Mass., a corporation of Delaware Application June 2, 1951, Serial No. 229,611

3 Claims. (Cl. 250—71)

This invention relates to means for detecting radiation of the kind emanating from radioactive or fissionable materials, said means being commonly called "dosimeters," and more particularly to apparatus of this character utilizing photosensitive materials for detecting, indicating, recording and measuring such radiation.

The present invention is particularly concerned with the detection of electromagnetic short-wave radiation lying within a wavelength range of from .2 Å. units to .002 Å. units, it being noteworthy that X-rays and gamma rays both are within this range. However, the term "radiation" as employed herein includes not only electromagnetic radiation having a wavelength shorter than a wavelength in the ultra-violet region of the spectrum, e. g., X-rays and gamma rays, but also the corpuscular radiation of alpha particles, beta particles, fission product particles, etc. The term "dose," from which the term "dosimeter" is derived, has reference to quantity of radiation and is measured in roentgens or "r."

An object of the present invention is to provide a dosimeter which contains a plurality of radiation-discriminating elements that produce varied effects on a sheet of photosensitive material within said dosimeter, which effects depend on the quality and quantity of incident radiation.

Another object of the invention is to provide a dosimeter of the above type in which the aforementioned varied effects are substantially independent of the direction from which the incident radiation is emanating.

Still another object of the invention is to provide a dosimeter capable of determining both instantaneous and cumulative doses.

A further object of the invention is to provide an intensifying element, a first portion of which emits more actinic radiation than does a second portion thereof.

A still further object of the invention is to provide means associated with said dosimeter whereby the direction from which incident radiation is emanating may be determined.

Still a further object of the present invention is to provide means for giving a definite photographic indication of the presence of radioactivity despite fogging of the photosensitive material by reason of overage film, light leakage, etc.

Still another object of the invention is to provide a dosimeter of the above type which is simple in operation and low in cost.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
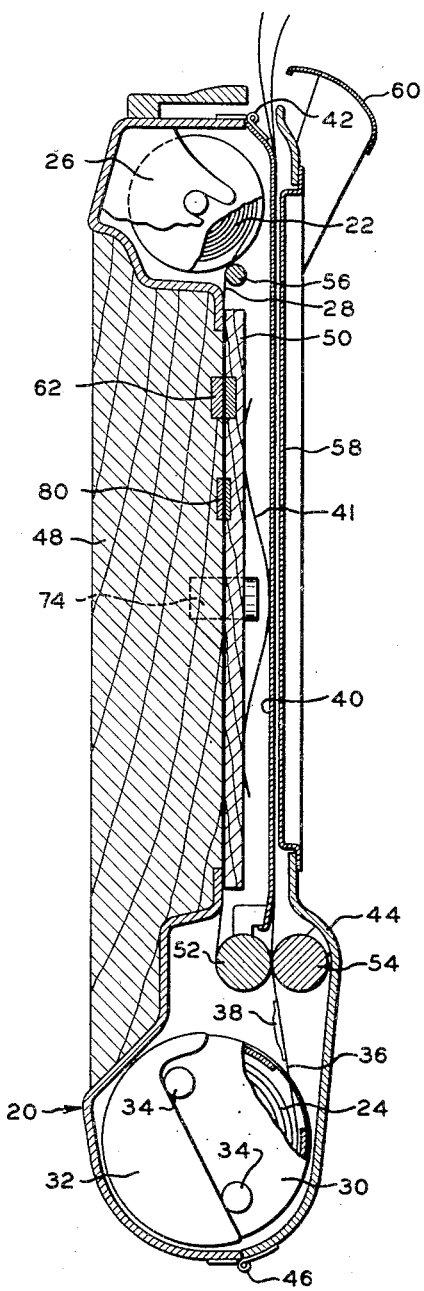
Figure 1 is a diagrammatic cross-sectional view of one preferred form of dosimeter embodying the present invention, with parts thereof omitted and parts thereof broken away.
Figure 7:
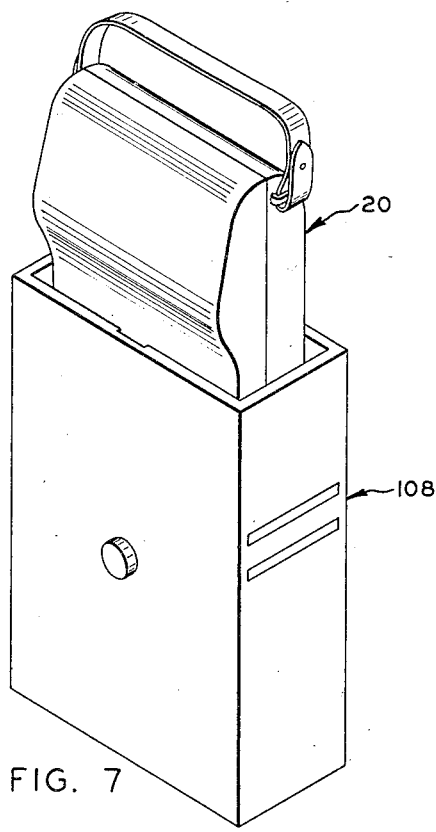
Figure 6:
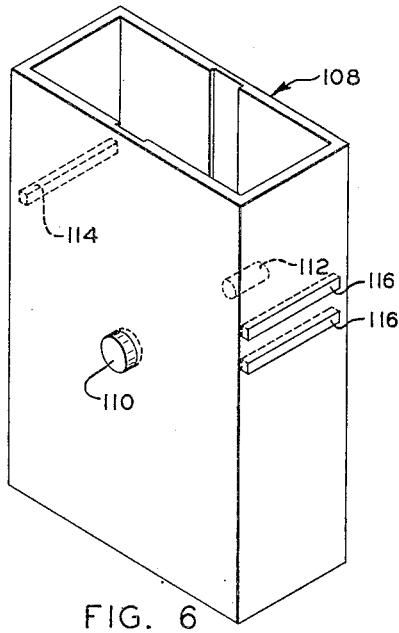

Fig. 6 is a perspective view of means, when the dosimeter of Fig. 1 is mounted therein, for indicating the direction, with respect to said dosimeter, of the source of incident radiation; and Fig. 7 is a perspective view of the dosimeter of Fig. 1 mounted in the direction-indicating means of Fig. 6 with the thickened bottom portion of the dosimeter of Fig. 1 (as viewed in Fig. 1) jutting from the top of the direction-indicating means of Fig. 6.

Photosensitive materials, in addition to being sensitive to light, generally are sensitive, also, to radiation of the kind emanating from radioactive or fissionable materials. An example of such a photosensitive material is a heavy metal salt, such as silver halide, which is capable, upon photoexposure, of having formed therein a latent image which is developable to the metal of the salt to provide a visible image. The present invention utilizes this property of photosensitive materials to provide the novel dosimeter herein disclosed.

Generally, the dosimeter disclosed herein comprises means for holding a first sheet of photosensitive film, said first sheet comprising a silver halide layer, means for positioning an image-receiving area of said first sheet for exposure, radiation-discriminating means which produce varied effects on said image-receiving area depending on the quality and quantity of incident radiation, and means for processing said first sheet within said dosimeter, said processing being accomplished by the spreading of a processing liquid between said first sheet and a second sheet also positioned within the dosimeter. The second sheet, in a preferred form thereof, supports a plurality of processing liquid containers at spaced intervals on one surface thereof. This surface is brought substantially into contact with the photosensitive surface of said first sheet and the two superposed sheets are passed between a pair of pressure-applying members to cause the release and spreading of the processing liquid between said sheets. The result of this procedure is to form in the image-receiving area of said first sheet a soluble silver complex from unexposed silver halide. This complex, at least in part, is transferred by imbibition to the second sheet where it is developed to silver to provide a positive image.

The photographic process and various species of first and second sheets herein referred to are described in detail in Patent No. 2,543,181, issued to Edwin H. Land on February 27, 1951, for Photographic Product Comprising a Rupturable Container Carrying a Photographic Processing Liquid. It is, of course, to be understood that the apparatus herein described is not limited to use with any particular species of first or second sheet, the terms "first sheet" and "second sheet" being used in their broadest sense to indicate a first sheet which is photosensitive and a second sheet which, merely, may aid in spreading the processing liquid over the surface of the first sheet or which may, if desired, possess other characteristics. Certain elements of the photographic apparatus herein referred to are described in detail in Patent No. 2,538,511, issued on January 16, 1951, to Murry N. Fairbank for Photographic Apparatus.

Referring now to the drawings, wherein like numerals refer to like parts, a preferred form of dosimeter embodying the present invention is shown in Fig. 1. Parts of the dosimeter of Fig. 1 are similar to parts of the camera housing disclosed in the aforementioned Patent No. 2,538,511, said camera housing having the lens, shutter mechanism, and bellows removed. The aforementioned camera housing is particularly well adapted to be converted into a dosimeter embodying the present invention, although it is to be understood that the precise structure of said camera housing is not necessary to a dosimeter embodying the present invention. The dosimeter of Fig. 1 comprises housing 20, one side of which is open, and which is adapted to enclose a first roll 22 and a second roll 24. First roll 22 is trunnioned on a pair of brackets 26, one of which is shown in Fig. 1, and comprises first sheet 28 of photosensitive material. Second roll 24 is rotatably contained in cylinder 30 which, in turn, is mounted on brackets 32, one of which is shown in Fig. 1. Abutments 34, two of which are mounted on each end of cylinder 30, engage brackets 32 to prevent rotation of said cylinder 30. Second roll 24 comprises second sheet 36 which supports a plurality of processing liquid containers 38. Inner partition 40, pivoted to housing 20 at 42, and outer cover 44, pivoted to housing 20 at 46, when in closed position, serve to transform open-back housing 20 into a light-tight photographic enclosure within which an image-receiving area of first sheet 28 may be exposed to incident radiation and developed in conjunction with second sheet 36.

The image-receiving area of first sheet 28 is adapted to be positioned for exposure to incident radiation between a plurality of radiation-discriminating elements mounted on a first mounting plate 48 and a plurality of radiation-discriminating elements mounted on second mounting plate 50. The radiation-discriminating elements will later be described in detail. First mounting plate 48 forms a wall of housing 20. Second mounting plate 50, resiliently mounted on inner partition 40 by means of leaf spring 41, is parallel to and closely adjacent first mounting plate 48, the image-receiving area of first sheet 28 being adapted to be positioned between said first and second mounting plates 48, 50 when the dosimeter is in operating condition.

Pressure members 52 and 54 are adapted to exert pressure on opposite sides of first and second sheets 28, 36 that have been superposed and that are being drawn between said pressure members to rupture the processing liquid container and to spread said processing liquid between said first and second sheets. First pressure member 52 is mounted on inner partition 40 and second pressure member 54 is mounted on outer cover 44, the pressure members 52, 54 being arranged to coact when the inner partition 40 and outer cover 44 are in closed position. Roller 56, suitably trunnioned on inner partition 40, insures smooth movement of the first sheet from the first roll into position between said first and second mounting plates.

The dark chamber formed between the inner partition 40 and outer cover 44, when said inner partition and outer cover are in closed position, protects the superposed first and second sheets from actinic light during the short predetermined processing period following passage of said superposed sheets between pressure members 52 and 54. Door 58 is provided in outer cover 44 for access to the superposed sheets within the dark chamber formed by inner partition 40 and outer cover 44. Swinging cutter blade 60 is hingedly mounted on outer cover 44 to enable the operator to sever superposed sheet portions, which have been drawn from the dark chamber, from the remainder of the superposed sheets still within the dosimeter.

The positioning and developing of the first and second sheets 28, 36 within housing 20 will now be described, the specific details of the operation of the radiation-discriminating elements and their effect on the image-receiving areas of the first and second sheets being reserved for later discussion. The cover 44 and inner partition 40 are swung open to permit loading of the first and second rolls within the housing. First sheet 28 is drawn across second plate 50 and around pressure member 52. Inner partition 40 is rotated to closed position and second sheet 36 is brought into contact with first sheet 28, the superposed first and second sheets then being drawn as a unit along the outer surface of partition 40 until their free ends extend beyond the pivoted end of inner partition 40. The outer cover 44 is now closed, thus forming a dark chamber between said outer cover 44 and the inner partition 40. The superposed first and second sheets are now drawn until an image-receiving area of the first sheet is properly positioned for exposure between first and second mounting plates 48, 50. Proper positioning is preferably accomplished by means of a stop (not shown) which engages apertures (not shown) in either the first or second sheet. At this point all excess superposed first and second sheet portions projecting from the dark chamber formed by the inner partition and outer cover may be severed from the sheet portions within the dark chamber by means of cutter blade 60. After an image-receiving area of the first sheet has been exposed, the superposed first and second sheets are again drawn from the dark chamber as before. During the drawing procedure, the passage of a processing liquid container 38 between pressure members 52 and 54 increases the hydraulic pressure in said container 38 until the processing liquid is forced out of the trailing edge of said container 38. As the drawing procedure continues, the liquid is spread in a thin layer between the image-receiving area of the first sheet and an associated image-receiving area of the second sheet, the processing liquid acting to bond the first and second sheets together and to carry out the formation of a positive image on the image-receiving area of the second sheet. The superposed image-receiving areas are allowed to remain in the dark chamber for a short predetermined processing time, after which door 58 is opened. The developed image-receiving area of the second sheet is then ripped from the remainder of the second sheet, the ripping being aided by a line of perforations which separates said image-receiving area from the remainder of the second sheet, and at the same time, the developed image-receiving area of the second sheet is peeled from the image-receiving area of the first sheet. In the dosimeter herein disclosed, the developed image-receiving area of the second sheet may be compared with graduated scales of gray values to determine the dose of radiation to which said dosimeter has been subjected. It is apparent, however, that a developed image-receiving area of a first sheet could similarly be compared with graduated scales of gray values.

Figure 2:
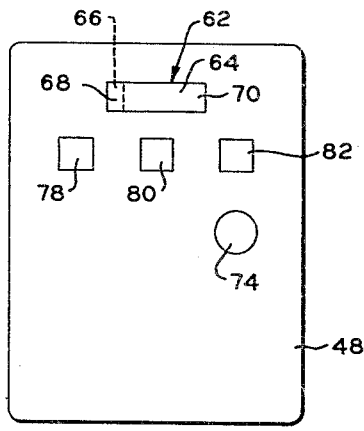
Fig. 2 is a plan view of the inner surface of one embodiment of a mounting plate which may constitute an element of the dosimeter of Fig. 1.
Figure 3:
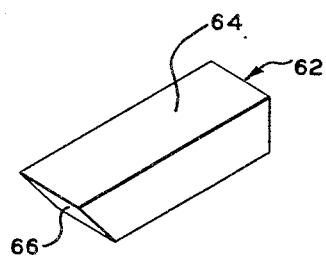
Fig. 3 is a perspective view of a fluorescent block which, in operation, is supported on the mounting plate shown in Fig. 2.
Figure 4:
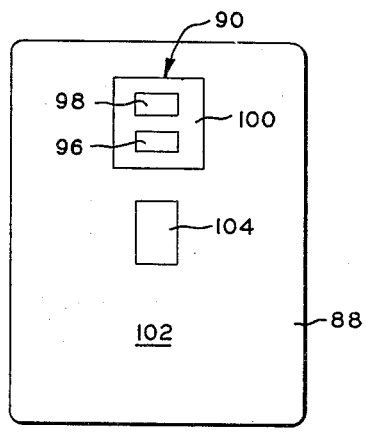
Fig. 4 is a plan view of the inner surface of an alternative embodiment of a mounting plate which may replace the mounting plate of Fig. 2 as an element of the dosimeter of Fig. 1.

Figs. 2 through 4 show two embodiments of mounting plates which may be associated with the dosimeter heredescribed, said mounting plates supporting a plurality of different radiation-discriminating elements. Said radiation-discriminating elements intensify and attenuate the actinic effect of radiation incident upon a sheet of photosensitive material within said dosimeter in different degrees, depending on the quality and quantity of incident radiation.

Fig. 2 is a plan view of the face of first mounting plate 48. The plurality of radiation-discriminating elements on first mounting plate 48, in conjunction with the similar plurality of elements on second mounting plate 50, gives the preferred dosimeter the ability to discriminate between doses in the range of from .05 to 200 r and to discriminate between different qualities of radiation. Gamma radiation approaching the dosimeter proceeds through the entire instrument with almost no attenuation. However, a very small fraction of the radiation is absorbed in the image-receiving area of the first sheet and in the radiation-discriminating elements on the first and second mounting plates. Absorption of said radiation in varying amounts by the discriminating elements, and the luminescence of block 62 of fluorescent material, produce varying degrees of exposure of the image-receiving area of first sheet 28, which area may then be developed in conjunction with the image-receiving area of second sheet 36 to indicate the quality and quantity of incident radiation.

Ordinary photosensitive materials are not appreciably exposed by short-wave radiation doses having only an order of magnitude of .05 r. Such a small dose would result in an exposure undiscernible from fogging of the photosensitive material by reason of old age, light leakage, etc. The present invention contemplates providing a camera with a radiation-intensifying means which, when struck by incident radiation of an intensity incapable of effectively exposing a photosensitive material, will emit fluorescent light having an appreciable effect on said photosensitive material. Oblong block 62, shown in perspective in Fig. 3, of a fluorescent material such, for example, as any one of stilbene, polyvinyl carbazole and terphenyl in polystyrene, by emitting actinic fluorescent light in the presence of short-wave radiation too weak by itself to affect a photosensitive layer appreciably, enables determination of a radiation dose in the range of from .05 to 5 r. Block 62 is mounted on mounting plate 48 so that its exposed surface 64 is substantially flush with the inner surface of mounting plate 48 (Fig. 1). Block 62, by producing a light area on a dark background, which light area is patently attributable only to radiation, provides a differential indication which is distinguishable from fogging of the photosensitive material due to average film or light leakage. It will be noted that the sloping surface 66 at one end of block 62 forms an acute angle, preferably of 45°, with exposed surface 64. Exposed surface 64 may be divided into an area 68 of comparatively high luminescence and an area 70 of comparatively low luminescence, the area of comparatively high luminescence being at the same end of oblong block 62 as is sloping surface 66. Block 62, in dimensions, preferably is of the order of one-quarter of an inch thick, one inch long and one-half inch wide. Such a block is particularly adapted to intensify the effect of X-rays and gamma rays of the kind herein referred to.

In the operation of block 62, incident radiation causes said block to fluoresce throughout its volume. Surface 66 acts to reflect much of the light emanating from within the block 62 toward the area 68 of comparatively high luminescence. Since block 62 is of an appreciable In the operation of block 62, incident radiation causes enough fluorescent light to emerge from the area 68 of comparatively high luminescence to produce a latent image on a portion of the image-receiving area of first sheet 28 which is associated with said area 68, said area 68 being closely adjacent said portion. Radiation doses of from .05 to .5 r produce, in the portion of the image-receiving area of the second sheet that is associated with area 68 of comparatively high luminescence, various shades of gray. The exact dose may be estimated by the operator with the aid of a first density scale (not shown) which contains graduations of gray with which the portion of the image area of the second sheet, associated with area 68 of block 62, may be compared. The light emerging from the area 70 of comparatively low luminescence produces an appreciable latent image in the portion of the image-receiving area of the second sheet with which it is associated, only if the dose of incident radiation is at least .5 r. In the portion of the image-receiving area of the second sheet associated with area 70 of block 62, radiation doses of from .5 to 5 r produce various shades of gray which represent a dose that may be estimated by the operator with the aid of a second density scale (not shown) containing graduations of gray similar to those contained in the first scale.

The greater part of the image-receiving areas of said first and second sheets are not associated with any radiation-discriminating element that intensifies or otherwise changes the character of incident radiation appreciably, and acquire images without benefit of any such elements. The useful range of density of the portions of the developed image-receiving area of the second sheet, not associated with any radiation-discriminating element, corresponds to a dose range of from 5 to 50 r, the dose being determined with the aid of a third scale (not shown).

Lead rod 74, preferably about one inch in length, is attached by suitable means to plate 48. Gamma radiation passing lengthwise through the lead rod 74 is largely absorbed, only about one-fourth of the radiation incident on the rod actually passing through. Thus, the portion of the image-receiving area of the second sheet, associated with lead rod 74, remains darker than it would if lead rod 74 were not present. The useful range of density of the portion of the developed image-receiving area of the second sheet, associated with lead rod 74, corresponds to a dose range of from 20 to 200 r, the dose corresponding to the various shades of gray in this high range being determined by means of a fourth scale (not shown).

The quality of the radiation incident upon the dosimeter may be determined by radiation-discriminating elements 78, 80 and 82, which are foil members, preferably of about 1 millimeter in thickness, each being composed of a different metal of high atomic number. Each foil member is mounted on plate 48 in such a manner that its exposed surface is substantially flush with the inner surface of plate 48. In a preferred embodiment, member 78 is composed of lead, member 80 of silver and member 82 of cadmium. The effects of members 78, 80 and 82 on the portions of the image-receiving area of the second sheet with which they are respectively associated have been determined. If the photon energy of the gamma or X-radiation is comparatively high, i. e., in the vicinity of 1.3 m. e. v. (million electron volts) the lead, silver and cadmium members 78, 80 and 82 will produce almost no attenuation on the incident radiation and the developed image-receiving area of the second sheet will appear almost equally heavily exposed in portions respectively associated with said lead, silver and cadmium members. If the photon energy is in the medium range, i. e., in the vicinity of .1 m. e. v., only the lead foil member 78 will produce appreciable attenuation and thus the portion of the image-receiving area of the second sheet that is associated with said lead foil member 78 will tend to appear less heavily exposed than do the portions associated with the silver and cadmium members. A fifth scale (not shown) enables the operator to evaluate this area. If the photon energy is comparatively low, approximately .04 m. e. v., the portions of the image-receiving area of the second sheet associated with said lead, silver and cadmium members will appear almost equally lightly exposed. If an appreciable fraction of the latent image is produced by slow neutrons, then the image in the portion of the image-receiving area of the second sheet associated with cadmium will be much reduced in intensity, since cadmium has an unusually high absorption for slow neutrons. A rough measure of the importance of neutrons may be obtained by a comparison of the portion of the image-receiving area of the second sheet associated with cadmium member 82 with a sixth scale (not shown).

Second plate 50 mounts a plurality of radiation-discriminating elements, each element being identical to an element which is its counterpart in the first plate 48, each element of the plurality of radiation-discriminating elements mounted on said second plate being reversely arranged with respect to its counterpart in said first plate, the exposed surface of each element being superposed on and parallel to its counterpart when the inner partition and the second plate are in operating position. The plurality of radiation-discriminating components mounted on said first plate constitutes in effect a mirror image of the plurality of radiation-discriminating components mounted on said second plate. When the second plate is in closed or operating position, it is closely adjacent and parallel to first plate 48.

It is desirable that the inner surfaces of each radiation-discriminating element and its counterpart be closely adjacent so that radiation, striking a portion of an image-receiving area placed therebetween at a small angle of incidence, which portion is associated with said closely adjacent elements, will necessarily pass through said elements to produce an exposure of said portion which, when compared with an appropriate scale, will give an accurate indication of the quality or quantity of incident radiation.

Figure 5:
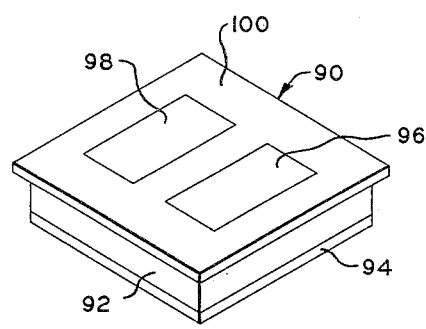
Fig. 5 is a perspective view of a fluorescent block which, in operation, is supported on the mounting plate shown in Fig. 4.

Fig. 4 is a plan view of the face of an alternative plate 88 which may replace plate 48 as a wall of dosimeter housing 20 and the mirror image of which may replace plate 50. Plate 88 mounts a fluorescent assembly 90 shown, in perspective, in Fig. 5. Fluorescent assembly 90 comprises ablong block 92 backed with a metal foil 94, such as aluminum foil, said metal foil 94 serving to reflect a large portion of the fluorescent light generated within said block toward windows 96 and 98. Metal shield 100, having windows 96 and 98, is superposed on fluorescent block 92. Window 96 is transparent in the range of wavelengths of radiation emitted by the fluorescent block 92. Window 98 attenuates the radiation emitted by the fluorescent block 92 and may comprise a polarizing sheet wthich transmits half the radiation transmitted by transparent window 96. Assembly 90 is mounted in plate 88 so that the exposed surface of metal shield 90 is substantially flush with the inner surface 102 of plate 88. Lead block 104 is mounted in plate 88, as shown in Fig. 4, with its exposed surface substantially flush with the inner surface 102 of plate 88.

It is apparent that the plurality of radiation-discriminating elements shown in Fig. 4 may be readily substituted for the plurality of radiation-discriminating elements shown in Fig. 2, the plates of Figs. 2 and 4 being similar in operation. Radiation incident on plate 88 is attenuated by metal shield 100 and lead block 104 and is intensified in different degrees by block 92 transmitting light from windows 96 and 98. The portions of the image-receiving area of the second sheet associated with the metal shield 100, window 96, window 98 and block 104 are used with appropriate scales to determine the radiation dose, in the manner described in connection with the various radiation-discriminating elements of plate 48.

The first roll 22, which comprises a sheet of photosensitive material, may be shielded from incident radiation by layers of lead. In practice, however, it has been found that the small dose, i. e., usually less than 5 r, to which the dosimeter will ordinarily be subjected, does not affect the first roll appreciably. In the operation of the dosimeter embodying the present invention, if the dose is large, i. e., usually greater than 5 r, only the image-receiving area of the first sheet, positioned between first and second plates 48, 50 during the exposure, may be evaluated and the remainder of the roll must be discarded.

In many situations the source of gamma radiation has a more or less fixed location. This is true, for example, of an air burst atomic bomb or for radiation from a small contaminated area on the floor of a "hot lab." Fig. 6 shows, in perspective, a means by which the direction of the source of radiation, with respect to the dosimeter of Fig. 1, may be determined. Stand 108, which essentially is a box having an open top, is adapted to support the dosimeter of Fig. 1 in an upright position, as shown in Fig. 7, with the thickened bottom portion of the dosimeter of Fig. 1 (as viewed in Fig. 1) jutting from the top of the direction-indicating means of Fig. 6. Short, thick lead rod 110 is mounted on the forward wall of stand 108. Long, thin lead rod 112 is mounted on the rear wall of stand 108. A single strip 114 of lead is mounted on a first side of stand 108. Two adjacent strips 116 of lead are mounted on a second side of stand 108. When dosimeter 20 is properly positioned in stand 108, lead elements 110, 112, 114 and 116 are higher in elevation than are the aforementioned radiation-discriminating elements, the photographic effects on the image-receiving areas of the first and second sheets produced by elements 110, 112, 114 and 116 being correspondingly higher on the resulting developed image area of the second sheet than are the effects produced by said discriminating elements. The positions of the "shadows" of elements 110, 112, 114 and 116 on the developed positive image area give an accurate indication of the direction from which incident radiation has been emanating. Thus, if an air burst occurs in front of the stand, a large light spot on the positive will occur. If the explosion comes from behind the stand, a small light spot will be produced because of long thin rod 112. If the explosion occurs to the left of the stand, the long slender strip will produce a slender faint shadow entirely across the developed positive image area. If the explosion occurs to the right of the stand, two long slender shadows will be produced entirely across the developed positive image area. It is to be understood that four other lead objects would serve the same purpose as do the rods 110, 112 and the strips 114, 116 just described. It is also to be understood that the lead objects, similar to elements 110, 112, 114 and 116, may be attached directly to the dosimeter housing 20 as by rubber suction cups, cement, screw means, etc.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic device for recording radiation doses, said device comprising a housing having a front portion, an intermediate portion and a rear portion, guide means on said front portion for predeterminedly positioning a photosensitive sheet within said housing, said intermediate portion being pivotally mounted on said front portion on one side of said guide means, said rear portion being pivotally mounted on said front portion on the other side of said guide means, said front portion, said intermediate portion and said rear portion being composed of materials which do not appreciably alter the actinic effect of X- and gamma radiation on said photosensitive sheet, a first group of radiation-discriminating elements mounted on said front portion, said radiation-discriminating elements in said first group having surfaces disposed substantially in a first plane, a second group of radiation-discriminating elements mounted on said intermediate portion, said second group of radiation-discriminating elements having surfaces disposed substantially in a second plane, at least one of said elements of said first group and at least one of said elements of said second group being composed of a material which appreciably diminishes the actinic effect of X- and gamma radiation on said photosensitive sheet, at least one of said elements of said first group and at least one of said elements of said second group being composed of a material which appreciably increases the actinic effect of X- and gamma radiation on said photosensitive sheet, a pair of pressure-applying members, one of said pressure-applying members being mounted on said intermediate portion, the other of said pressure-applying members being mounted on said rear portion, said rear portion and said intermediate portion, when in open position, providing access to the interior of said housing, said intermediate portion, when in closed position, defining, in conjunction with said front portion, an exposure chamber, said first plane and said second plane being closely superposed within said exposure chamber and given radiation-discriminating elements of said first group being aligned with similar radiation-discriminating elements of said second group when said intermediate portion is in closed position, said pressure-applying members, when said rear portion and said intermediate portion are in closed position, being capable of receiving therebetween said photosensitive sheet and another sheet in superposed relation and being capable of forming therefrom a sandwich by spreading a thin layer of processing composition between said sheets, said rear portion and said intermediate portion, when in closed position, defining a processing chamber adapted to receive said sandwich from said pressure-applying members, said processing chamber having a mouth at said opposite side of said front portion through which said sandwich may be removed from said processing chamber.

2. The photographic device of claim 1 wherein one of said radiation-discriminating elements of said first group and one of said radiation-discriminating elements of said second group each is a block of material which fluoresces when subjected to X- or gamma radiation, said block having a first surface disposed substantially in one of said planes, one end of said block having a second surface which intersects said first surface at an acute angle whereby said first surface of said block is divided into an area of relatively high luminescence and an area of relatively low luminescence.

3. The photographic device of claim 1 wherein said first group of radiation-discriminating elements and said second group of radiation-discriminating elements each includes a block of material which fluoresces when subjected to X- or gamma radiation, said block having a surface disposed in one of said planes and a metal shield for said surface, said metal shield having two windows, one window being substantially transparent to radiation emitted by said block and the second window being of a character which appreciably attenuates radiation emitted by said block.

References Cited in the file of this patent

UNITED STATES PATENTS

| | | |
|---|---|---|
| 1,420,440 | Moorhouse | June 20, 1922 |
| 2,483,991 | Wollan et al. | Oct. 4, 1949 |
| 2,496,218 | Kieffer | Jan. 31, 1950 |
| 2,505,346 | Williams | Apr. 25, 1950 |
| 2,538,511 | Fairbank | Jan. 16, 1951 |
| 2,543,180 | Land | Feb. 27, 1951 |
| 2,559,219 | Ludeman | July 3, 1951 |

OTHER REFERENCES

Scintillation Counting with Anthracene, Bell et al., AECD–1889, April 20, 1948, pages 1–6.

Physical Review, May 15, 1948, p. 1210.